US012810274B2

(12) United States Patent
Smith et al.

(10) Patent No.: US 12,810,274 B2
(45) Date of Patent: Nov. 24, 2026

(54) PROCESSING TRANSACTIONS FOR AN UNATTENDED SELF-SERVICE VENDING KIOSK

(71) Applicant: Swyft, Inc., San Francisco, CA (US)

(72) Inventors: Lincoln Smith, San Francisco, CA (US); Gower Smith, San Francisco, CA (US); James Winsor, San Francisco, CA (US); Vikranth Katpally, San Francisco, CA (US)

(73) Assignee: Swyft Inc., San Francisco, CA (US)

( * ) Notice: Subject to any disclaimer, the term of this patent is extended or adjusted under 35 U.S.C. 154(b) by 449 days.

(21) Appl. No.: 16/893,389

(22) Filed: Jun. 4, 2020

(65) Prior Publication Data

US 2020/0387881 A1 Dec. 10, 2020

Related U.S. Application Data

(60) Provisional application No. 62/857,245, filed on Jun. 4, 2019.

(51) Int. Cl.

| | |
|---|---|
| ***G06Q 20/18*** | (2012.01) |
| ***G06F 21/31*** | (2013.01) |
| ***G06Q 10/0836*** | (2023.01) |
| ***G06Q 10/087*** | (2023.01) |
| ***G06Q 20/40*** | (2012.01) |
| ***G06Q 30/0601*** | (2023.01) |
| ***G07C 9/37*** | (2020.01) |

(52) U.S. Cl.

CPC ............. *G06Q 20/18* (2013.01); *G06F 21/31* (2013.01); *G06Q 10/0836* (2013.01);

(Continued)

(58) Field of Classification Search

CPC .. G06Q 20/18; G06Q 20/40145; G06Q 20/32; G06Q 20/3278; G06Q 10/087; G06Q 20/16; G06Q 20/20; G06Q 20/322; G06Q 30/0601; G06Q 20/04; G06Q 20/326; G06Q 10/0836; G06Q 30/0633; G06Q 30/0639; G07F 9/002; G07F 9/026; G07F 9/08; G07F 5/22; G07F 5/18; G07F 9/00; G07F 11/00; G07F 5/00; G07F 5/24; G07F 9/001; G07F 9/02; G07F 17/32; G07F 17/3223; G07F 17/3234; G07F 11/62; G07F 9/06; G07F 17/0014; G07F 19/211; G07C 9/37; G07C 9/33; G07C 9/23; G07C 9/38; G09F 9/00;

(Continued)

(56) References Cited

U.S. PATENT DOCUMENTS

| | | | |
|---|---|---|---|
| 6,535,790 | B2 | 3/2003 | Nakano |
| 9,111,313 | B2 | 8/2015 | Chirnomas |

(Continued)

FOREIGN PATENT DOCUMENTS

| | | | | |
|---|---|---|---|---|
| CN | 206011103 U | 3/2017 | | |
| WO | 01/13342 | 2/2001 | | |
| WO | WO-2015092076 A1 * | 6/2015 | ............. | G07F 11/62 |

OTHER PUBLICATIONS

PCT International Search Report and Written Opinion in International Application PCT/US18/50524, mailed Jan. 15, 2019, 14 pages.

(Continued)

*Primary Examiner* — Avia Salman
(74) *Attorney, Agent, or Firm* — Toering Patents PLLC

(57) ABSTRACT

The present application describes methods and systems for processing transaction on a series of unattended self-service vending kiosks or machines.

18 Claims, 4 Drawing Sheets

(52) U.S. Cl.
CPC ..... *G06Q 10/087* (2013.01); *G06Q 20/40145* (2013.01); *G06Q 30/0633* (2013.01); *G06Q 30/0639* (2013.01); *G07C 9/37* (2020.01); *G05B 2219/40233* (2013.01)

(58) Field of Classification Search
CPC ......... H04L 63/10; H04L 67/04; H04L 67/20; G06K 17/0022; G05B 2219/40233; G06F 21/31; G01F 9/003; G01G 11/02; G01G 11/04; G01G 11/06; G08B 13/1472; H05B 6/6464; H01L 27/1112; H01L 224/7592; H01L 2224/7692; H01L 2224/7792; H01L 2224/7892; H01L 2224/7992
USPC ............................................................ 705/39
See application file for complete search history.

(56) References Cited

U.S. PATENT DOCUMENTS

| | | | | |
|---|---|---|---|---|
| 9,430,788 | B2 | 8/2016 | Stiernagle | |
| 9,636,825 | B2 | 5/2017 | Penn | |
| 2004/0201449 | A1* | 10/2004 | Denison | G07C 9/00896 340/5.23 |
| 2006/0220845 | A1* | 10/2006 | Agrawal | G08B 13/08 340/5.9 |
| 2014/0222603 | A1* | 8/2014 | Hay | G06Q 20/18 705/16 |
| 2017/0121113 | A1 | 5/2017 | Wagner | |
| 2017/0242438 | A1 | 8/2017 | Chan | |
| 2020/0082369 | A1 | 3/2020 | Smith | |
| 2020/0143613 | A1* | 5/2020 | Carter | G07C 9/30 |
| 2020/0387857 | A1 | 12/2020 | Smith | |

OTHER PUBLICATIONS

PCT International Preliminary Report on Patentability in International Application PCT/US18/50524, mailed Mar. 26, 2020, 3 pages.

Solebox Berlin Opening with Patrick Mohr meets Reebok Classic (solebox), Jul. 16, 2014, online at: https://www.youtube.com/watch?v=WI_I0gfBUbw, entire video, especially demonstration at 0:16-0:24.

* cited by examiner

PROCESSING TRANSACTIONS FOR AN UNATTENDED SELF-SERVICE VENDING KIOSK

CROSS-REFERENCE TO RELATED APPLICATION

This applications claims priority to U.S. Provisional Patent Application No. 62/857,245 filed on Jun. 4, 2019 and titled "Mechanical Transfer From Vending Machine to Robot Retrofit Kit For Traditional Retail Stores That Provides An Automated Delivery System Methods and Processes For Wireless Payments On An Automated Unattended Self-Service Vending Kiosk System", the entire disclosure of which is hereby incorporated by reference in its entirety.

BACKGROUND

Vending machines typically offer a number of different items to individuals in a convenient manner. However, each time the individual wants to purchase an item from the vending machine, the individual must provide additional funds to the vending machine. Thus, for multiple transactions, this may become tedious and the individual may decide not to purchase an item or to purchase additional items.

SUMMARY

The present application describes methods and systems for processing transactions on a series of unattended self-service vending kiosks or machines. For example, a particular location may have a number of different vending kiosks or machines. Each vending kiosk or machine may house a number of different items for sale. For example, a first vending kiosk may house drinks that may be purchased by an individual while a second vending kiosk may house chips that may be purchased by the individual. Prior to the systems and methods described herein, the individual would be required to perform two different transactions (e.g., swipe a credit card, insert money, etc.) to purchase a drink from the first vending kiosk and to purchase chips from the second vending kiosk. Additionally, when the transaction information for each purchase is processed and subsequently provided to the individual (e.g., a bank statement, credit card statement, etc.), each transaction would be listed separately.

Accordingly, aspects of the present application describe a method for processing transactions from multiple unattended self-service vending kiosks. As such, a purchase made from multiple different vending kiosks may be performed in a single transaction. In some examples, the method includes receiving transaction information associated with a first vending kiosk. In response to receiving the transaction information, a first locking mechanism associated with a first door of the first vending kiosk is automatically unlocked. A first sensor associated with the first vending kiosk detects when a first physical item is removed from the first vending kiosk. In response to this detection, information associated with the first physical item is added to a virtual list of items, such as, for example, a virtual shopping cart. A determination may be made, using sensor information obtained from a second sensor associated with a second vending kiosk, that a second locking mechanism associated with a second door of the second vending kiosk is to be unlocked. The second locking mechanism associated with the second door of the second vending kiosk may be unlocked and a third sensor associated with the second vending kiosk may detect removal of a second physical item from the second vending kiosk. Information associated with the second physical item may then be added to the virtual list of items.

The present application also describes a system, comprising a processor and a memory coupled to the processor and storing instructions that, when executed by the processor, perform operations. These operations may include receiving transaction information associated with a first vending kiosk. In response to receiving the transaction information, causing a first locking mechanism associated with a first door of the first vending kiosk to be unlocked. The system may detect, using a first sensor associated with the first vending kiosk, removal of a first physical item from the first vending kiosk when the first door is open. Information associated with the first physical item may be added to a virtual list of items. The system may then determine, using sensor information obtained from a second sensor associated with a second vending kiosk, that a second locking mechanism associated with a second door of the second vending kiosk is to be unlocked. In response to this determination, the system may cause the second locking mechanism associated with the second door of the second vending kiosk to be unlocked. A third sensor associated with the second vending kiosk may detect removal of a second physical item from the second vending kiosk when the second door is open. Information associated with the second physical item is added to the virtual list of items. A single transaction for the first physical item and the second physical item may then be completed using the transaction information when a timer associated with the transaction information has expired.

Also described is a method for processing a transaction for an unattended self-service vending kiosk. In some examples, the method includes receiving identification information from a computing device associated with an individual. In response to receiving the identification information, a first locking mechanism associated with a first door of a first vending kiosk is unlocked. A first sensor associated with the first vending kiosk detects removal of a first physical item from the first vending kiosk when the first door is open. Information associated with the first physical item is added to a virtual list of items. The identification information may be used to unlock a second locking mechanism associated with a second door of a second vending kiosk. In some examples, the identification information indicates the computing device is within a threshold distance from the second vending kiosk. A second sensor associated with the second vending kiosk may detect removal of a second physical item from the second vending kiosk when the second door is open. Information associated with the second physical item is then added to the virtual list of items. A single transaction may then be completed for the first physical item and the second physical item.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
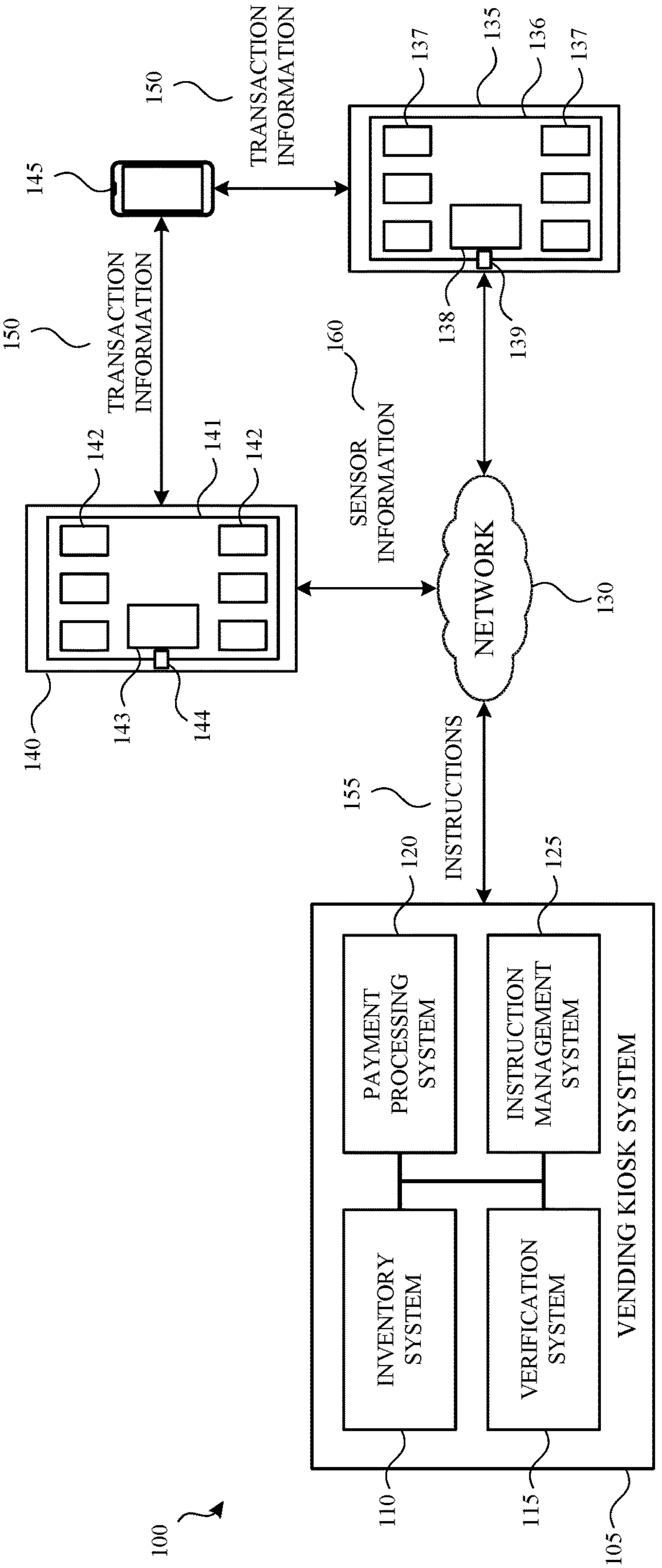
FIG. 1 illustrates an example system for processing transactions for a group of unattended self-service vending kiosks according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The concepts described herein provide methods and systems for seamlessly transferring payment and/or other personalized credentials between a plurality of automated unattended self-service vending kiosks, vending machines or other such systems. In some examples, the vending kiosks are in close proximity or are otherwise ganged together to form a group. Additionally, each of the vending kiosks may be able to communicate with other vending kiosks in the group via wired or wireless communication channels. The vending kiosks may also be able to communicate with various computing devices associated with individuals to enable each individual to purchase items provided by the vending kiosks in a single transaction.

For example, when credentials associated with an individual have been identified and confirmed (e.g., via direct connection or indirect wireless connection with a receiving or payment processing device on any one of the vending kiosks), the individual is allowed to move from vending kiosk to vending kiosk without the need or requirement for re-validation of the credentials. In some examples, the vending kiosk may be locked. However, using the systems and methods described, each vending kiosk accessed by the individual may be unlocked using the credentials. In some examples, the vending kiosk may be unlocked utilizing touch-sensitive unlocking methods. In other examples, a computing device associated with the individual may send unlock instructions to the vending kiosk when the individual is within a predetermined distance from the vending kiosk. In yet another example, the vending kiosk may be unlocked in response to biometric information associated with the individual.

Regarding the touch-sensitive unlocking aspect, when an individual has successfully gained access to any one of the vending kiosks, and subsequently touches any part of another vending kiosk (e.g., a door of a vending kiosk, a handle of a vending kiosk, etc.), a code (or other information) associated with the first vending kiosk (or generated in response to the first vending kiosk being opened/unlocked) is sent to a locking system associated with the second vending kiosk. In another example, the second vending kiosk generates a code (or other information) and transmits it to the first vending kiosk for verification. In some aspects, the locking system (of either the first vending kiosk or second vending kiosk) may modulate a wireless signal to a local close proximity or NFC device associated with a vending kiosk payment device (or other means of NFC device integrated within the vending kiosk). The vending kiosk may then communicate with the computing device of the individual to determine whether a code (or other such information) matches. When the code matches, the vending kiosk that is being touched is automatically unlocked without requiring re-validation. Although a NFC device is specifically mentioned, any type of communication channel may be used.

In some examples, once the code from the vending kiosk has been confirmed with the computing device and the door is unlocked, items within a virtual shopping cart from one of the vending kiosks is transferred or otherwise aggregated with items in a virtual shopping cart associated with the current vending kiosk.

FIG. 1 illustrates an example system 100 for processing transactions for an unattended self-service vending kiosk according to one or more examples. In some examples, the system 100 may include a number of different self-service vending kiosks (referred to as "vending kiosks"). For example and as shown in FIG. 1, the system 100 may include a first vending kiosk 135 and a second vending kiosk 140. Although two vending kiosks are shown, the system 100 may include any number of vending kiosks.

The system 100 may also include a vending kiosk system 105 that tracks inventory information associated with each vending kiosk. The vending kiosk system 105 may also track payment information provided by individuals that are purchasing items housed by each vending kiosk. The vending kiosk system 105 may also verify/authenticate an identity of various individuals that are accessing each vending kiosk. Additionally, the vending kiosk system 105 may provide instructions (e.g., unlock instructions) to each vending kiosk.

In some examples, the vending kiosk system 105 may be communicatively coupled to the first vending kiosk 135 and the second vending kiosk 140 via a network 130. In other examples, the vending kiosk system 105, or various subsystems of the vending kiosk system 105, may be associated or otherwise integrated with one or more of the first vending kiosk 135 and/or the second vending kiosk 140.

In some examples, the first vending kiosk 135 is physically independent from the second vending kiosk 140. For example, the first vending kiosk 135 may be placed in a first location and the second vending kiosk 140 may be placed in a second location. The first location and the second location may be in proximity to one another. In another example, the first vending kiosk 135 and the second vending kiosk 140 may be integrated or otherwise combined in the same housing or unit. However, the items in each of the vending kiosks may be separated by an inner wall or other structure.

In some examples, each vending kiosk may include a door, a locking mechanism and a payment processing mechanism or device. For example, the first vending kiosk 135 includes a door 136, a payment processing mechanism 138 and a locking mechanism 139. Likewise, the second vending kiosk 140 includes a door 141, a payment processing mechanism 143 and a locking mechanism 144. Although each of these components are shown, each vending kiosk is not required to have each of these components. Each vending kiosk may have additional systems and components such as, for example, those shown and described with respect to FIG. 2 below.

In some examples, each vending kiosk may house or otherwise provide various items that may be purchased by an individual. For example, the first vending kiosk 135 may include items 137 and the second vending kiosk 140 may include items 142.

When an individual wants to purchase one or more items from a vending kiosk, the individual may provide transaction information 150 to the vending kiosk. Transaction information 150 may be provided to the payment processing mechanism 138 of the first vending kiosk 135 and/or the payment processing mechanism 143 of the second vending kiosk 140 by a computing device 145. Although a computing device is specifically mentioned, any type of payment apparatus may be used including a credit card, debit card, contactless payment apparatus, online payment/money transfer service, mobile wallet, information from an application executing on the computing device 145 and so on. The transaction information 150 may include payment information associated with any number of payment mechanisms/systems including, but not limited to contactless payment services, online payment services, bank or credit card information, account information associated with a provider of the vending kiosks and/or a supplier of items and so on. In some examples, the transaction information 150 may be provided by the individual. For example, the individual may swipe a credit card through the payment processing mechanism 138/143, provide a PIN number to the payment processing mechanism 138/143 and so on.

In some examples, the transaction information 150 may also include biometric data or other such information associated with an individual that is using or otherwise accessing the computing device 145. In yet another example, the transaction information 150 may include information that allows the computing device 145 to be paired with or otherwise communicate with one or more components or systems integrated or otherwise associated with the vending kiosk.

In some examples, the transaction information 150 may include a preauthorized amount of money that may be held for various transactions across the same or different vending kiosks. For example, when the individual swipes a credit card (or provides other types of payment information) a predetermined amount of money (e.g., $20.00) is preauthorized. If the individual pulls $11.00 worth of items from the first vending kiosk 135 and moves to the second vending kiosk 140, the individual may provide transaction information 150 to the second vending kiosk 140. In some examples, the transaction information 150 at the second vending kiosk may be a swipe of a credit card or other means of providing payment information. When the transaction information 150 is received at the second vending kiosk 140, the $11.00 worth of items in the virtual shopping cart is prevented from settling and a second preauthorization amount is held (e.g., another $20.00). Thus, the total amount authorized is $31.00 in this example (e.g., $11.00 consumed and $20.00 available). If the individual takes $5.00 worth of items from the second vending kiosk 140, the total amount settled and charged to the card in a single transaction is $16.00 after a set amount of time.

Once the transaction information 150 is provided to the vending kiosk, the payment processing system 120 of the vending kiosk system 105 may verify the transaction information 150. For example, the payment processing system 120 may verify that sufficient funds are available in an account identified by the transaction information. In some examples, the payment processing system 120 will hold a predetermined or preauthorized amount of funds such as described. In some examples, the payment processing system 120 and the verification system 115 may communicate with each other to authenticate/verify an identity of the individual, verify the individual is authorized to use funds specified by the transaction information 150 and so on. Once the transaction information 150 has been verified, the instruction management system 125 may cause the locking mechanism of the vending kiosk to be unlocked. Once the locking mechanism is unlocked, the individual may open the door and select an item.

Continuing with the example above, when the individual wants to purchase a drink from the first vending kiosk 135, transaction information 150 is provided to the payment processing device 138. The first vending kiosk 135 may transmit, over the network 130, the transaction information 150 to the payment processing system 120 for verification. Once verified, the instruction management system 125 of the vending kiosk system 105 may transmit instructions 155 to the locking mechanism 139 of the first vending kiosk 135 to unlock—thereby allowing the individual to open the door 136 and have access to the items 137.

When the individual selects an item 137 and removes it from the first vending kiosk 135, one or more sensors (e.g., sensor(s) 210 (FIG. 2)) detect removal of the item 137 and/or detect the type of item 137 being removed. The sensor information 160 is then provided to the vending kiosk system 105. The vending kiosk system 105 may use the sensor information to determine a price of the item(s) 137, a quantity of items 137 being removed, etc. The sensor information 160 may also be used by the inventory system 110 to track inventory information associated with the first vending kiosk 135. In some examples, the item 137 may be tracked as the individual moves from vending kiosk to vending kiosk.

In some examples, the sensor may be a weight sensor that detects a change in weight of the items 137 housed in the first vending kiosk 135. From this change in weight, the vending kiosk system 105 is able to determine the type and/or quantity of items that have been removed and update a virtual shopping cart associated with the individual/transaction with information about the item 137 (e.g., price of the item 137, quantity of the item 137, etc.). In another example, the sensor is a camera or other image sensor that captures one or more images of the item 137 or items being removed. As this sensor data is analyzed, the vending kiosk system 105 is able to determine the type and/or quantity of items that have been removed. The virtual shopping cart may be updated accordingly. Although specific sensors have been mentioned, other sensors may be used. In yet other examples, each item may be scanned by a system that can read computer generated codes such as bar codes, QR codes, etc. In another example, each item may be associated with a RFID tag or other such identifier.

When the item 137 has been removed from the first vending kiosk 135, the change in inventory may be tracked by the inventory system 110. For example, if the item 137 selected by the individual is a drink, virtual inventory information associated with that particular type of drink is updated by the inventory system 110. In some examples, the payment processing system 120 may create or otherwise store information about the particular item in a virtual shopping chart associated with the individual and/or associated with the current transaction. The payment processing system 120 may also create or start a timer that allows the individual to unlock other vending kiosks and select additional items to add to the current transaction/virtual shopping cart.

For example, when the item 137 has been removed from the first vending kiosk 135 (or when transaction information 150 is received/verified by the vending kiosk system 105), the item 137 is added to a virtual shopping cart associated with the individual. In some examples, a five minute "shopping timer" may be initiated. During that five minute shopping timer, the individual may select additional items 137 from the first vending kiosk 135. Each item 137 that is removed will be recognized by the vending kiosk system 105 using the various sensors described above. Upon removal of the physical item 137, a virtual item that corresponds to the physical item 137 is added the virtual shopping cart.

In some examples, the vending kiosk system 105 detects when an item has been returned to the vending kiosk 135 (e.g., the individual changed her mind and is either returning the item or selecting a different item). In such examples, vending kiosk system 105 updates the virtual shopping chart in real-time or substantially real-time, updates a total amount of money due for each item in the virtual shopping cart in real time or substantially real-time and/or updates inventory information associated with the items (e.g., inventory information stored by the inventory system 110) in real-time or substantially real-time.

When the individual is finished shopping at the first vending kiosk 135, the individual may want to purchase an item from the second vending kiosk 140. However, as discussed above, as long as the individual accesses the second vending kiosk 140 (e.g., opens the door 141, removes an item 142, touches the second vending kiosk 140) before expiration of the shopping timer, the individual may add additional physical items to the virtual shopping cart such as previously described.

For example, as the individual approaches the second vending kiosk 140, the verification system 115 of the vending kiosk system 105 may verify the identity of the individual and determine whether the individual is associated with the previously established shopping session (e.g., the shopping session that occurred at the first vending kiosk 135). In some examples, the verification/authentication that occurs may include verification of biometric information associated with the individual. In another example, the computing device 145 associated with the individual may be paired with one or more of the vending kiosks such that when the computing device 145 is within a predetermined distance of the second vending kiosk 140 the locking mechanism 144 is automatically unlocked. For example, the computing device 145 and the locking mechanism 144 may communicate with each other over a near-field communication channel thereby causing the locking mechanism to be unlocked (or locked when the communication channel is broken (e.g., due to the computing device 145 being located outside a predetermined distance from the second vending kiosk 140)). In another example, the individual may be required to provide the same or similar transaction information 150 (e.g., same credit card swipe, user identification/passcode, computer-readable code, etc.) to the second vending kiosk 145 that was provided to the first vending kiosk 135. In some examples, this can be referred to as user token. The user token may have an identifier associated with a payment apparatus (e.g., credit card, bank account number, online payment information, etc.) which may be communicated/used across the different vending kiosks and/or mobile applications and/or digital wallets that are associated with the user.

In yet another example, the locking mechanism may be unlocked utilizing touch-sensitive methods such as described above. In yet another example, an application or other instructions executing on the computing device 145 may transmit unlock instructions to a particular locking mechanism of a particular vending kiosk based on a determined position of the individual with respect to a determined location of the particular vending kiosk.

Upon expiration of the shopping timer, the payment processing system aggregates the total cost of all the items in the virtual shopping cart and completes a single transaction for each of the items—regardless of which vending kiosk initially housed the item. Thus, when the individual receives her statement/receipt for the transaction, the details of the transaction are combined into a single transaction. In some examples, the aggregation of items may occur in response to input provided by the individual. For example, the movements of the individual may be tracked or otherwise monitored and the transaction may be aggregated when the individual has moved a predetermined distance from the vending kiosks. In another example, location information of the individual may be provided by the computing device and the items may be aggregated and the transaction be completed based, at least in part, on the location information. In another example, the individual may provide input on the vending kiosk and/or the computing device 145 indicating the transaction is complete.

In some examples, an individual may inadvertently (or purposefully) put an item taken from one vending kiosk (e.g., first vending kiosk 135) into a different vending kiosk (e.g., second vending kiosk 140). In such examples, the vending kiosk system 105 may still recognize or otherwise identify the item that is being returned using the various sensors and update the inventory information and/or the virtual shopping cart associated with the individual accordingly.

In some examples, the vending kiosks may be retrofitted with the various systems and components described herein. For example, a refrigerated unit, shelf, vending machine or other kiosk (e.g., those that may be located at convenience stores, airports, train stations, etc.) may be retrofitted with one or more of the described systems.

The system 100 also allows the various vending kiosks to be restocked. For example, the inventory system 110 of vending kiosk system 105 may transmit a message or other such notification to a supplier of items indicating that a particular vending kiosk needs to be restocked. When the supplier arrives at the vending kiosk, the supplier may be verified/authenticated such as previously described. As the supplier stocks the vending kiosk with physical items, the various sensors associated with the vending kiosk will recognize the physical item such as previously described. The inventory system 110 may then update inventory information associated with the vending kiosk in real-time or substantially real-time.

Figure 2:
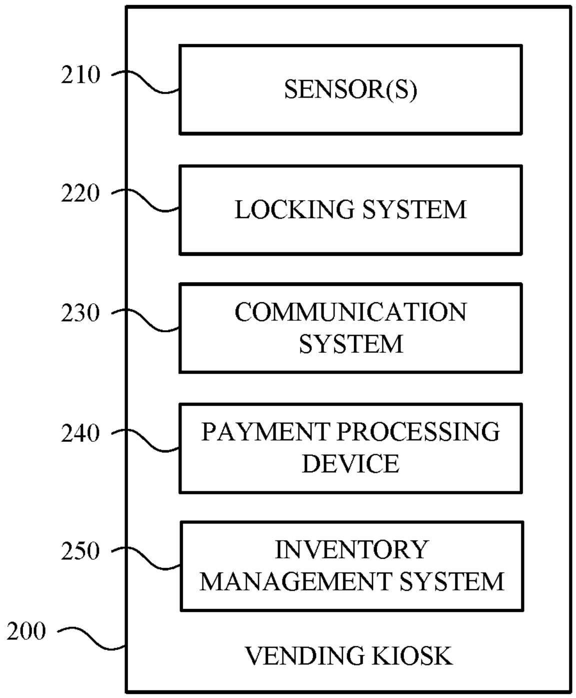
FIG. 2 illustrates an example vending kiosk that may be associated with the example system shown and described with respect to FIG. 1 according to one or more examples.

FIG. 2 illustrates an example vending kiosk 200 that may be associated with the example system 100 shown and described with respect to FIG. 1 according to one or more examples. For example, the vending kiosk 200 may include one or more sensors 210. The sensors 210 may be used to identify and/or determine the type of physical item being removed from the vending kiosk, the quantity of items being removed from the vending kiosk, whether an item is being returned to the vending kiosk, whether the item being returned has been opened, consumed or partially consumed (e.g., using, for example computer vision, detecting the breaking of a seal, detecting a change in weight of the item, etc.). Example sensors include, but are not limited to, image sensors, weight sensors, RFID sensors, infrared sensors, light sensors, pressure sensors and so on.

Although physical items are mentioned, it is contemplated that the vending kiosk may be used to recognize physical items that are consumed electronically/digitally, such as, for example, gift cards, game codes and the like.

The sensors 210 may also include biometric sensors or other such components or systems that can verify the identity of an individual or otherwise authenticate the individual. For example, the sensors 210 may be fingerprint sensors, facial recognition sensors, gait sensors, etc.

The vending kiosk 200 may also include a locking system 220 that enables or otherwise controls access to the vending kiosk 200. The locking system 220 may be incorporated into a door of the vending kiosk. In some examples, the locking system 220 is a magnetic locking system. In other examples, the locking system 220 includes a bolt or other such structure that prevents the door from being opened while a locking mechanism of the locking system 220 is engaged.

The vending kiosk 200 also includes a communication system 230. The communication system enables the transmission of data to/from a vending kiosk system such as described above with respect to FIG. 1. The communication system 230 may also enable vending kiosks to transmit and/or receive information from other vending kiosks and/or other computing devices such as computing devices associated with the individual.

The vending kiosk 200 may also include a payment processing device 240. The payment processing device may function in a similar manner to the payment processing devices described with respect to FIG. 1. The vending kiosk 200 may also include an inventory management system 250. The inventory management system 250 may track the physical inventory currently available at the vending kiosk 200. In other examples, the inventory management system 250 may communicate with an inventory management system of a remote vending kiosk system.

In other examples, the inventory management system 250 may communicate inventory information directly to a computing device associated with an individual. This allows the individual to select items for purchase on her computing device prior to accessing the vending kiosk 200. In some examples, this may also allow the individual to provide payment details for the transaction to the vending kiosk system. When the individual arrives at the vending kiosk 200 and removes the items previously selected via the computing device, the items that are removed from the vending kiosk 200 are identified and compared with the items in the virtual shopping cart (e.g., the items the user selected via her computing device). If the type and/or quantity of the items match, the transaction is completed in a similar manner as described above. If additional items are removed or if some of the items are not taken (e.g., the individual changes her mind) the inventory management system 250 reconciles the differences and the transaction is updated.

Although the above example is described with respect to FIG. 2, it is contemplated that the system 100 described above, or components/sub-systems described above could also implement the described examples. For example, the individual may order or otherwise select various items for purchase on an application or webpage executing/displayed on the computing device. When the individual arrives at the vending kiosks, various items may be housed in different vending kiosks. In such examples, the user may take each item from each of the different vending kiosks in a similar manner as described above. Once the items have been taken and verified, a single transaction may be processed for all of the items.

Figure 3:
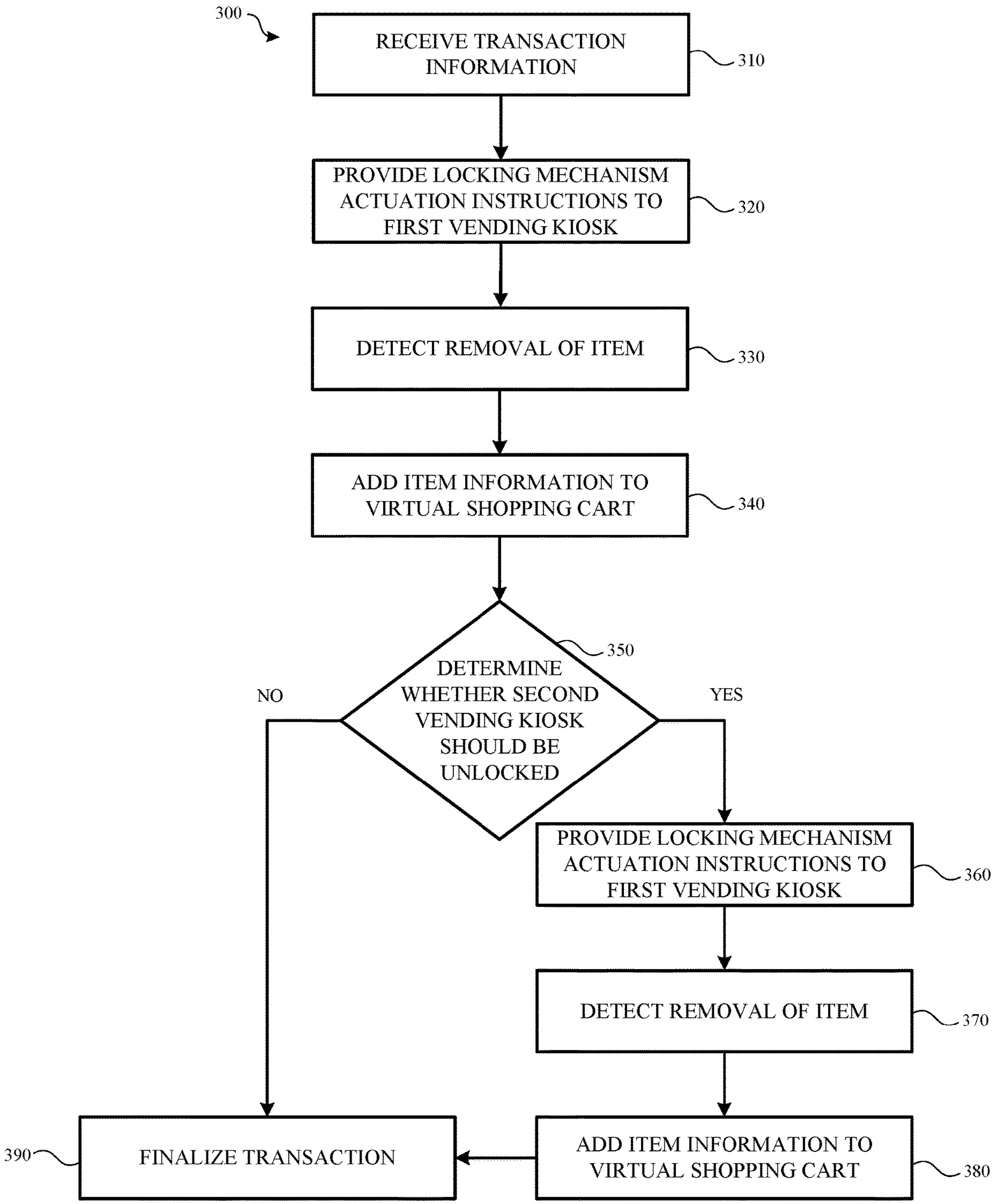
FIG. 3 illustrates an example method for processing transactions for a group of unattended self-service vending kiosk according to one or more examples.

FIG. 3 illustrates an example method 300 for processing a transaction for an unattended self-service vending kiosk according to one or more examples. The method 300 may be performed by the system 100 described above with respect to FIG. 1.

The method begins when transaction information is received (310). In some examples, the transaction information is received by a vending kiosk from a computing device associated with an individual. The vending kiosk, or the computing device, may transmit the transaction information to a cloud-based system such as, for example, a vending kiosk system. In some examples, the transaction information may include identification information associated with the individual such as biometric information, a PIN number associated with the individual, a username and/or password associated with the individual, an avatar associated with the individual and so on. In some examples, receipt of transaction information begins a shopping timer and/or causes the generation of a virtual shopping cart associated with the individual/transaction such as described above.

When the information has been verified, the system provides (320) locking mechanism actuation instructions to a first vending kiosk of a group of vending kiosks. The actuation instructions causes the locking mechanism of the first vending kiosk to unlock thereby allowing the individual to open a door associated with the first vending kiosk. In some examples, opening of the door begins (or resets) a shopping timer associated with the individual/transaction such as described above.

The system may then detect (330) removal of an item from the first vending kiosk. In some examples, the removal of the item begins (or resets) a shopping timer associated with the individual/transaction such as described above. The removal of the item may be determined by one or more sensors associated with the first vending kiosk.

In response to the removal of the item, the system adds (340) the item information to a virtual shopping cart associated with the individual. Although removal of a single item is specifically mentioned, multiple items may be removed. As each item is removed, information associated with the item is added to the virtual shopping cart. Similarly, if an item is returned, information about the item is removed from the virtual shopping cart. In some examples, an update to the virtual shopping cart begins (or resets) a shopping timer associated with the individual/transaction such as described above.

The system may also determine (350) whether a second vending kiosk in the group of vending kiosks should be unlocked. In some examples, the determination is made based, at least in part, on a shopping timer associated with the individual. In other examples, this determination is based, at least in part, on sensor information associated with the second vending kiosk. In other examples, the determination is based on authentication information associated with the individual and/or a computing device associated with the individual.

If it is determined the second vending kiosk should not be unlocked, the transaction is finalized (390). For example, the price of all items that have been removed from the first vending kiosk is determined and a single transaction is made for all of the items. In some examples, the transaction may also be finalized in response to input provided by the individual (e.g., input received on a computing device, on a payment processing device of the vending kiosk, etc.). In other examples, the transaction may be finalized when the individual is outside of a predetermined distance or area from the vending kiosk (e.g., the sensors of the vending kiosk cannot detect a presence of the individual, the computing device of the individual is no longer paired with the vending kiosk etc.). In some examples, the door of the first vending kiosk is locked in response to the transaction being finalized. In another example, the door of the first vending kiosk is locked once the door is closed.

However, if it is determined (350) that the second vending kiosk in the group of vending kiosks should be unlocked, the system provides (360) locking mechanism actuation instructions to the second vending kiosk. The actuation instructions causes the locking mechanism to unlock thereby allowing the individual to open a door associated with the second vending kiosk. In some examples, opening of the door resets the shopping timer associated with the individual/transaction such as described above.

The system may then detect (370) removal of an item from the second vending kiosk. In some examples, removal of the item from the second vending kiosk resets the shopping timer associated with the individual/transaction such as described above. The removal of the item may be determined by one or more sensors associated with the second vending kiosk. In response to the removal of the item, the system adds (380) the item information to the virtual shopping cart associated with the individual such as previously described. Although removal of a single item is specifically mentioned, multiple items may be removed and/or replaced. In such examples, the system updates the inventory information and virtual shopping cart accordingly such as previously described. In some examples, an update to the virtual shopping cart resets the shopping timer associated with the individual/transaction such as described above.

When the shopping timer expires, the system finalizes (390) or otherwise processes the transaction for all of the items in a single transaction. In some examples, the transaction may also be finalized in response to input provided by the individual (e.g., input received on a computing device, on a payment processing device of the vending kiosk, etc.). In other examples, the transaction may be finalized when the door of the vending kiosk is closed, the individual is outside of a predetermined distance or area from the vending kiosk (e.g., the sensors of the vending kiosk cannot detect a presence of the individual, the computing device of the individual is no longer paired with the vending kiosk etc.).

Figure 4:
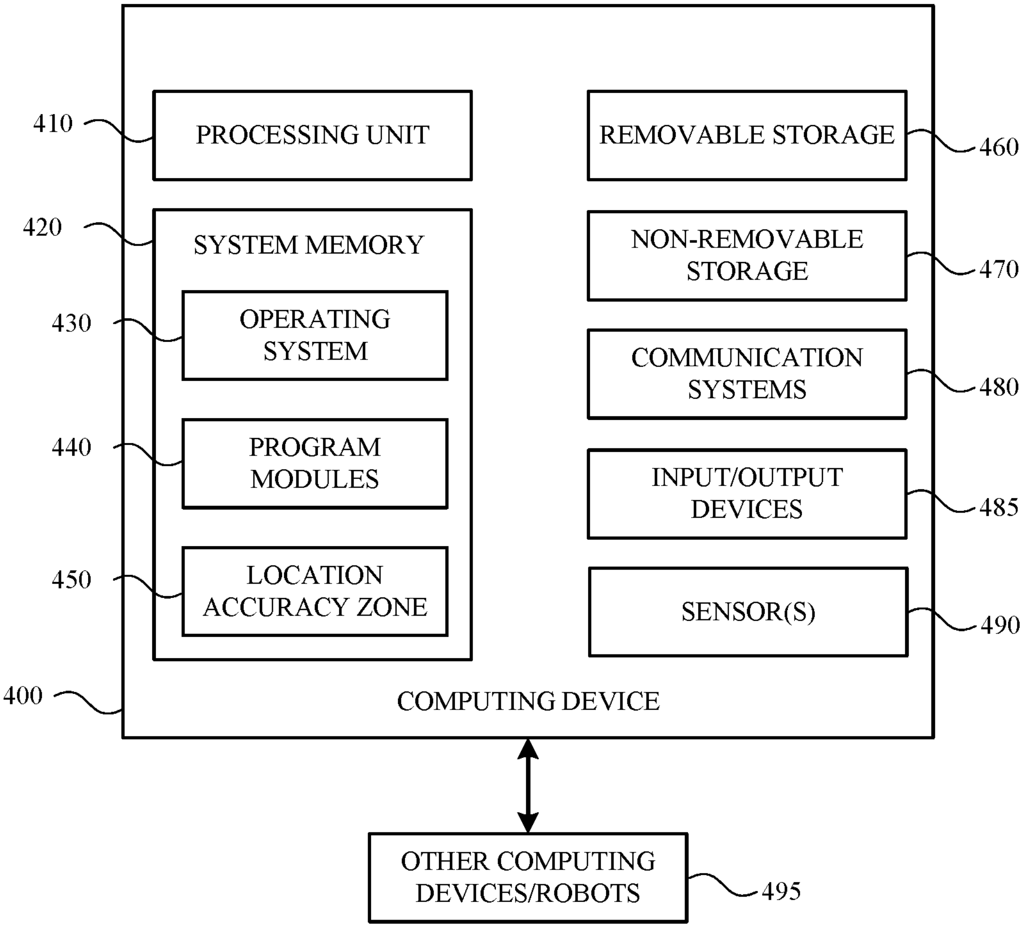
FIG. 4 is a block diagram of an example computing device that may be integrated with or be part of the various systems described herein according to one or more examples.

FIG. 4 is a system diagram of a computing device 400 according to an example. The computing device 400, or various components and systems of the computing device 400, may be integrated or associated with the various systems, vending kiosks, and/or subsystems described herein. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining authentication details of individuals, providing instructions to the vending kiosks, providing inventory updates, and so on. The memory 420 may also store and/or provide access credentials, payment information associated with an individual, and/or inventory information such as described above. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495, robots, and/or other automated inventory detection, retrieval and delivery systems, vending machines etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:

receiving transaction information associated with an individual at a first vending kiosk, wherein the first vending kiosk comprises: a first door, a first locking mechanism, a first sensor, and a first payment processing device;

in response to receiving the transaction information, causing the first locking mechanism associated with the first door of the first vending kiosk to be unlocked;

detecting, using the first sensor of the first vending kiosk, removal of a first physical item from the first vending kiosk;

adding information associated with the first physical item to a virtual list of items for the individual;

determining, using information associated with the individual obtained at a second vending kiosk, wherein the second vending kiosk comprises: a second door, a second locking mechanism, a second sensor, and a second payment processing device, that the second locking mechanism associated with the second door of the second vending kiosk is to be unlocked;

causing the second locking mechanism associated with the second door of the second vending kiosk to be unlocked;

detecting, using the second sensor of the second vending kiosk, removal of a second physical item from the second vending kiosk;

adding information associated with the second physical item to the virtual list of items; and completing a single transaction using the transaction information and the virtual list of items, the single transaction comprising purchase of both the first physical item from the first vending kiosk and the second physical item from the second vending kiosk, wherein the first vending kiosk is physically separate from and not combined with the second vending kiosk in the same housing.

2. The method of claim 1, further comprising generating an identifier associated with an individual that provided the transaction information.

3. The method of claim 2, further comprising verifying an identity of the individual at the second vending kiosk using the identifier.

4. The method of claim 2, further comprising associating a timer with the identifier, the timer specifying an amount of time the identifier is associated with the individual.

5. The method of claim 1, wherein the information associated with the first physical item is pricing information for the first physical item.

6. The method of claim 1, wherein the virtual list of items is a virtual shopping cart.

7. The method of claim 1, further comprising determining, using sensor information provided by the first sensor, that the first physical item has been returned to the first vending kiosk.

8. The method of claim 7, further comprising removing the information associated with the first physical item from the virtual list of items in response to determining that the first physical item has been returned to the first vending kiosk.

9. The method of claim 1, further comprising associating a timer with the transaction information.

10. The method of claim 1, further comprising locking the locking mechanism associated with the first door of the first vending kiosk based, at least in part, on sensor information provided by a fourth sensor associated with the first vending kiosk.

11. The method of claim 10, wherein the sensor information provided by the fourth sensor indicates that an individual associated with the transaction information has moved over a threshold distance away from the first vending kiosk.

12. A system, comprising:

a processor; and a memory coupled to the processor and storing instructions that, when executed by the processor, perform operations, comprising:

receiving transaction information associated with an individual at a first vending kiosk, wherein the first vending kiosk comprises: a first door, a first locking mechanism, a first sensor, and a first payment processing device;

in response, to receiving the transaction information, causing the first locking mechanism associated with the first door of the first vending kiosk to be unlocked;

detecting, using the first sensor associated with the first vending kiosk, removal of a first physical item from the first vending kiosk when the first door is open;

adding information associated with the first physical item to a virtual list of items;

determining, using information associated with the individual obtained at a second vending kiosk, wherein the second vending kiosk comprises: a second door, a second locking mechanism, a second sensor, and a second payment processing device, that the second locking mechanism associated with the second door of the second vending kiosk is to be unlocked;

causing the second locking mechanism associated with the second door of the second vending kiosk to be unlocked;

detecting, using the second sensor of the second vending kiosk, removal of a second physical item from the second vending kiosk when the second door is open;

adding information associated with the second physical item to the virtual list of items; and completing a single transaction for the first physical item and the second physical item using the transaction information and the virtual list of items when a time associated with the transaction information has expired, wherein the first vending kiosk is physically separate from and not combined with the second vending kiosk in the same housing.

13. The system of claim 12, further comprising instructions for resetting a timer in response to detecting the second door is open.

14. The system of claim 12, further comprising instructions for receiving an identifier associated with an individual that provided the transaction information.

15. The system of claim 14, wherein the identifier is used to cause the second locking mechanism associated with the second door of the second vending kiosk to be unlocked.

16. The system of claim 14, wherein the identifier comprises biometric information of the individual.

17. The system of claim 14, wherein the identifier is associated with a computing device associated with the individual.

18. A method, comprising:

receiving identification information from a computing device associated with an individual at a first vending kiosk, the first vending kiosk comprising: a first door, a first locking mechanism, a first sensor, and a first payment processing device;

in response to receiving the identification information, causing the first locking mechanism associated with the first door of the first vending kiosk to be unlocked;

detecting, using the first sensor of associated with the first vending kiosk, removal of a first physical item from the first vending kiosk when the first door is open;

adding information associated with the first physical item to a virtual list of items;

receiving the identification information at a second vending kiosk when the computing device is within a threshold distance from the second vending kiosk, the second vending kiosk comprising: a second door, a second locking mechanism, a second sensor, and a second payment processing device;

unlocking the second locking mechanism associated with the second door of the second vending kiosk;

detecting, using the second sensor associated with the second vending kiosk, removal of a second physical item from the second vending kiosk when the second door is open;

adding information associated with the second physical item to the virtual list of items; and completing a single transaction for the first physical item and the second physical item using the virtual list of items, wherein the first vending kiosk is physically separate from and not combined with the second vending kiosk in the same housing.

* * * * *